US006390269B1

(12) United States Patent
Billington et al.

(10) Patent No.: US 6,390,269 B1
(45) Date of Patent: May 21, 2002

(54) MONEY HANDLING MECHANISM WITH PERIPHERAL PORT

(75) Inventors: Gregory John Billington; Andrew Simon Pope, both of Reading (GB)

(73) Assignee: Mars Incorporated, McLean, VA (US)

(*) Notice: Subject to any disclaimer, the term of this patent is extended or adjusted under 35 U.S.C. 154(b) by 0 days.

(21) Appl. No.: 09/546,126

(22) Filed: Apr. 10, 2000

(30) Foreign Application Priority Data

Apr. 16, 1999 (GB) ............................................ 9908830

(51) Int. Cl.[7] ................................................ G06F 9/00
(52) U.S. Cl. ....................................................... 194/217
(58) Field of Search ........................ 453/2, 63; 194/217

(56) References Cited

U.S. PATENT DOCUMENTS 3,653,480 A 4/1972 Yamamoto et al. ............ 194/4
3,826,344 A 7/1974 Wahlberg ...................... 194/2
4,359,631 A 11/1982 Lockwood et al. ......... 235/381
4,669,596 A * 6/1987 Capers et al. ............... 194/210
4,877,950 A 10/1989 Halpern ...................... 235/487
5,450,938 A * 9/1995 Rademacher ............... 194/206
5,641,050 A * 6/1997 Smith et al. ................ 194/210
5,822,216 A 10/1998 Satchell, Jr. et al. ..... 34/479.01
6,250,452 B1 * 6/2001 Partyka et al. .............. 194/217

FOREIGN PATENT DOCUMENTS

GB 2 186 412 A 8/1987 ............ G07D/7/00

* cited by examiner

*Primary Examiner*—Donald P. Walsh
*Assistant Examiner*—Mark J. Beauchaine
(74) *Attorney, Agent, or Firm*—Fish & Richardson P.C.

(57) ABSTRACT

A money handling mechanism 110 has a first port P1 for connection to a machine controller 130 and a second port P2 to which further money handling mechanisms can be connected. Different types of mechanism, such as a card acceptor 70 or a bill validator 100, can be connected to the second port P2 over a bus B. The first port P1 may be connected to one of several interface adapters 410 to 416, and the communications protocol used is selected accordingly. If the first port P1 uses the same protocol as the second port P2, signals are passed transparently between the first port P1 and the second port P2. Signals from the additional mechanism may be modified to be recognisable by the controller 130. The money handling mechanism 110 may convert between the denominations of currencies represented in the protocols over the first and second ports P1 and P2.

23 Claims, 4 Drawing Sheets

MONEY HANDLING MECHANISM WITH PERIPHERAL PORT

The present invention relates to a mechanism for handling money.

Coin or bill handling mechanisms are typically sold to manufacturers of complete machines, such as vending machines, as a unit with a port connectable to a controller within the machine. For example, a coin changer validates coins and outputs a signal on the port indicating the value of acceptable coins received. The machine controller receives signals from a user interface indicating the goods selected, determines the price of the goods, compares the price with the value of coins received, and determines whether there has been an overpayment. If so, the machine controller sends a signal to the changer port indicating the value of change to be given. The changer or the machine controller determine what combination of coins is to be dispensed to make up this value, and the changer dispenses that combination of coins.

Certain standards have been agreed for the physical and electrical connection of peripheral devices to machine controllers. One such standard is the 'International Multi-drop Bus Interface Standard'(the MDB standard). According to this standard, the vending machine controller and peripheral devices are each connected to a common bus. Signals exchanged on the bus comply with a protocol defined by the standard and allow commands to be issued to the peripherals by the vending machine controller and status reports to be sent back by the peripherals to the controller.

However, there are many vending machines already in use in which the input/output port of the vending machine controller complies with an obsolete standard or does not support multiple peripherals, so that the machine cannot be upgraded by adding peripherals.

With the introduction of the Euro, there will be a need to add peripherals for validating Euro banknotes to machines which currently can accept only coins. There will also be a greatly increased need for machines to accept payment in more than one currency. Moreover. as the use of pre-paid or debit cards becomes more widespread, but cash continues to be used, there will be a need to add card readers to machines which currently accept only cash.

According to the present invention, there is provided a first money handling unit which has a first port for connection to a machine controller and a second port for connection to a second money handling unit. In this way, at least one further unit may be added to a machine without the need to alter the interface between the machine controller and the first unit.

According to one aspect of the present invention, the second port is connectable to any one of a number of different money handling units, and may implement a single standard interface for such a connection. An advantage of this arrangement is that, where the machine controller is not able to communicate directly with multiple different types of money handling unit, the first money handling unit according to this aspect of the invention provides the required connectivity instead.

In embodiments of the invention, the first money handling unit is a changer which validates and dispenses coins or tokens, while the second money handling unit may be a banknote validator, a card reader or a further changer, for example.

The interface across the second port may implement a different protocol from that implemented across the first port, and the first unit then converts signals between the two protocols. In this way the second unit, although incompatible with the controller, may be used in the same system as the controller.

According to a second aspect of the invention, the interfaces across the first and second port may implement the same protocol and the second unit may be physically connectable either to the second port or directly to the controller, for example via a bus connection. When the second unit is connected to the second port, the first unit copies all signals from the second port to the first port and copies at least those signals addressed to the second unit, and preferably all signals, from the first port to the second port, while responding to signals addressed to the first unit on the first port. This allows the second unit to function correctly when it is physically connected to the second port.

According to a third aspect of the invention, the second unit is a device of a first type, and the first unit converts between communications on the second port with the second unit and communications on the first port representative of a unit of a second type different from the first type. This allows units of the first type to be used where the machine controller does not recognise units of the first type but does recognise units of the second type.

According to a fourth aspect of the invention, the first unit communicates with the controller by representing values in a first denomination and the first unit communicates with the second unit by representing values in a second denomination, and the first unit converts between the first and second denominations.

Arrangements embodying the invention will now be described by way of example with reference to the accompanying drawings, in which.

Figure 1:
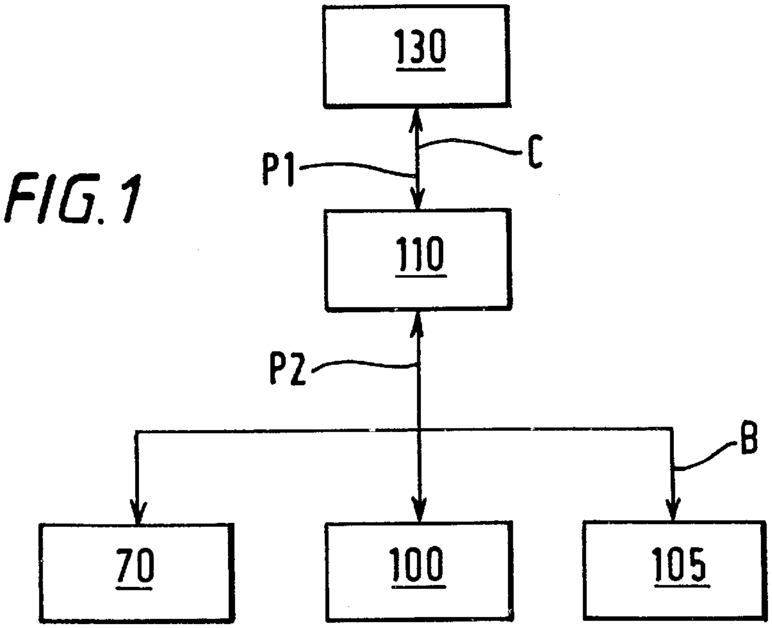
FIG. 1 is a schematic diagram showing the connections between a vending machine controller, a changer and further money handling units in embodiments of the present invention.

As shown in FIG. 1, a changer 110 in an embodiment of the present invention has a first port P1 for connection to a vending machine controller 130 via a communication line C. The changer 110 receives and validates coins or tokens and indicates the value of the coins accepted to the controller 130, over the first port P1. The changer 110 also dispenses accepted coins as change, in response to commands received from the controller 130 over the first port P1. These commands may indicate the value of change to be given, or the specific coins to be given as change, according to the interface standard used over the first port P1.

The changer 110 also has a second port P2 which provides an interface compatible with the MDB protocol. According to this protocol. payment units of different types can be connected to a host (in this case, the changer 110 ) without having to reconfigure or reprogram the host. Instead, the host interrogates all connected devices, each of which responds with a code indicating the type of that device, the codes being defined by the MDB standard. The host is pre-programmed with a set of commands and responses appropriate to each type of device. The devices supported include a card acceptor 70, a bill validator 100 and a change dispenser 105. Multiple devices of different types or of the same type can be connected and operated simultaneously via a bus connection to the changer 110. The pin connections of the second port P2 are as follows:

TABLE 1

Second Port MDB Pinout

| Pin | Function |
|---|---|
| 1 | 34 V DC (Supply from Changer) |
| 2 | 0 V DC (Supply Return) |
| 3 | Not Connected |
| 4 | Master Receive (input to changer) |
| 5 | Master Transmit (output from changer) |
| 6 | Common (Signal Return) |

The second port P2 includes a physical connector 440, such as a socket, complying with the MDB standard, and an interface adaptor 430.

The changer 110 can be configured to implement any one of a number of different standard interfaces over the first port P1 in order to match the interface of the controller 130 to which the changer 110 is to be connected. A separate interface adapter is provided within the changer 110 for each respective standard supported by the changer. A cable connector and a port connector appropriate for the desired standard is plugged into the appropriate interface adapter. A controller within the changer recognises which interface adapter is in use and automatically runs protocol software appropriate to that standard. The software for each standard is stored within the changer 110.

Figure 2:
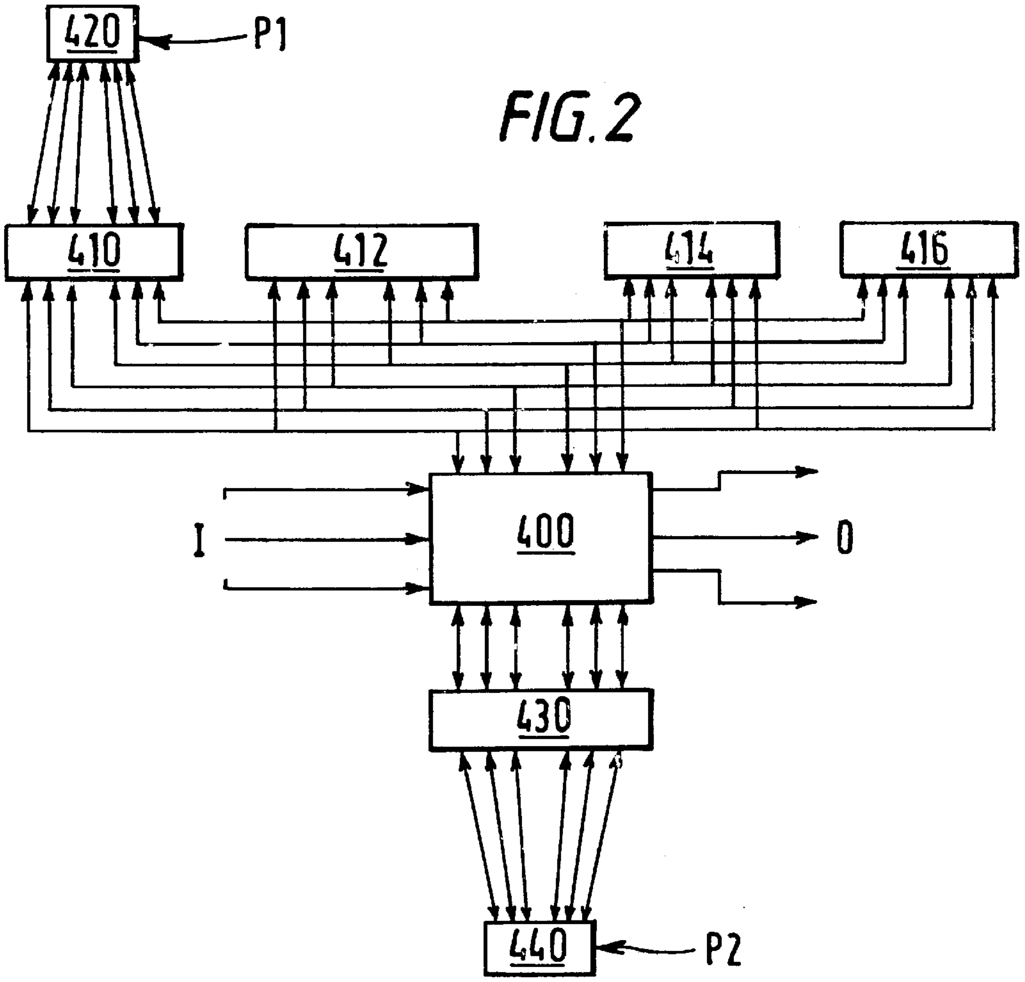
FIG. 2 is a schematic diagram showing the internal electronic arrangement of the changer.

FIG. 2 shows the electronic connections within the changer 110. A microcontroller 400 is connected to the first through fourth interface adapters 410, 412, 414, 416 which convert between the low voltage inputs and outputs from the microcontroller 400 and the input and output voltages required respectively by first to fourth interface standards with which the first port P1 complies according to the configuration of the changer. A first port connector 420 which complies with the physical requirements of the required interface is connected to the appropriate one of the interface adapters 410 to 416. The first port connector 420 may be a plug connector extending from the changer 110 on a cable, the other end of which is connected to the appropriate interface adapter 410, 412, 414, 416 by a plug and socket connection.

The first supported interface is an MDB compatible interface, which implements an MDB protocol to Level 3 of the First Version, Aug. 19, 1994, so that the changer 110 can interoperate with the controller 130 if the latter operates to level 2 or 3. The controller 130 issues commands to pay out coins either of a specified type or to a specified value, to change the mode of operation of the changer, and to request specific status information from the changer. The MDB protocol supports 16 different coin values, with the maximum value of the largest coin being 255 times the value of the smallest coin. The first port connector 420 is connected to the first interface adapter 410, and comprises a six-way MDB connector, with pins connected as follows:

TABLE 2

MDB Connector Pinout

| Pin | Function |
|---|---|
| 1 | 34 V DC (supply from Host) |
| 2 | 0 V DC (supply return) |
| 3 | Not Connected |
| 4 | Master Receive (Output from Changer, input to Controller) |
| 5 | Master Receive (Input to Changer, output from Controller) |
| 6 | COMMON (Signal return) |

The MDB signal lines operate on a current loop principle. The host (controller 130 ) acts as a current source for both the Master Transmit and Master Receive circuits. If the host sources current into the Master Receive loop, all connected devices can receive the transmitted data. In order to transmit, a device closes the loop on the Master Receive line, which is detected by the host.

The second interface supported by the second interface adapter 412 complies with the Executive protocol defined by the Mars Electronics International Protocol A specification (MEI Reference No. 10102-000304001-PS). The first port connector 420 then comprises an Executive Communications Connector and an Executive Power Connector, with pin connections as follows:

TABLE 3

Executive Communications Connector

| Pin | Function |
|---|---|
| 1 | TX+ |
| 2 | RX− |
| 3 | RX+ |
| 4 | TX− |
| 5 | unused |
| 6 | unused |
| 7 | unused |
| 8 | unused |
| 9 | screen |

TABLE 4

Executive Power Connector

| Pin | Function |
|---|---|
| 1 | 24 V AC |
| 2 | 24 V AC |
| 3–15 | Not Connected |

The third interface supported by the third interface adapter 414 complies with the BDV protocol defined by standard BDV001 produced by the BVD committee. The port connector is AMP Type 350720-1 (Universal Part Number). The pin connections are as follows:

TABLE 5

BDV Pinout

| Pin | Function |
|---|---|
| 1 | DC Return |
| 2 | 24 V DC |
| 3 | unused |
| 4 | unused |
| 5 | TX+ |
| 6 | TX− |
| 7 | RX+ |
| 8 | RX− |
| 9 | Screen |

The fourth interface adapter 416 implements both the European Electromechanical interface defined by the Mars Electronics International specification 'European Single Price and Four Price Electro-Mechanical Interface' and the US electromechanical interface as defined in 'United States TRC One Price Electro Mechanical Interface'. The shape and pinout of the connector varies according to the type of the electromechanical machine. Various parameters of the electromechanical interface are configurable by the operator.

The changer 110 receives power from the controller 130 over the first port P1. The microcontroller 400 detects to which of the interface adapters 410 to 416 power is applied, identifies therefrom the type of interface in use. Software appropriate to that interface is then automatically loaded into the microcontroller 400 from a store within the changer 110, such as an EPROM. The software implements the appropriate protocol.

Further inputs I to the microcontroller 400 are connected to sensors for sensing the presence and/or properties of coins received by the changer 110. For example, some of the sensors may be used to sense properties of received coins to determine whether they are genuine, others detect the progress of a coin through the mechanism, while others detect the level of coins present in coin tubes from which change is dispensed. Further outputs O from the microcontroller 400 are connected to mechanisms for releasing coins to be dispensed and directing the coins into coin tubes or a reject path according to their sensed properties.

When the MDB protocol is implemented over both the first port P1 and the second port P2, further MDB compatible money handling units may be connected either to the bus connection B to the second port P2, or to the bus connection to the controller 130. The microcontroller 400 detects whether a money handling unit is connected to the second port P2 by sending a 'POLL' command on the Master Transmit line. If no response is received within the standard time-out period, it is assumed that there are no units connected, and the microcontroller 400 only handles communications over the first port P1.

If a unit is detected as being connected, the microcontroller 400 echoes all MDB signals received on the second port P2 to the first port P1, and echoes all MDB signals received on the first port P1 to the second port P2. Preferably, the received signals are decoded, and the code values are stored at least temporarily in memory before being re-encoded without alteration, and then output. As the MDB standard is based on a bus connection, the additional unit therefore operates as if it were connected to the bus connection of the controller 130. This mode of operation ensures that additional MDB devices will work correctly regardless of whether they are connected to the controller 130 or to the changer 110.

In an alternative, the second port P2 implements a version of the MDB protocol not supported over the first port P1, for example to support units not recognised by the version of the MDB protocol implemented by the controller 130. In that case, the microcontroller 400 only echoes those MDB signals common to both protocols. In response to a 'POLL' command from the controller 130, the microcontroller 400 sends a 'POLL' command to the additional unit on the second port P2. If the additional unit responds with a code indicating a device type not supported by the controller 130, the microcontroller 400 replaces this with a code indicating a similar device type supported by the controller 130. The microcontroller also converts signals from the additional unit, which do not form part of the protocol supported by the controller 130, to signals which are recognised by that protocol. For example, if the additional unit is a receiver for an electronic 'purse' or smartcard from which payments can be both deducted and added, the changer 110 may identify this receiver as a prepaid or debit card to which payments cannot be made. In this way new types of payment can be used, albeit with limited functionality.

However, when the MDB protocol is not enabled over the first port P1, the microcontroller 400 communicates with the controller 130 over the first port P1 using a different protocol from that used to communicate with the additional money handling device or devices connected to the second port P2. The microcontroller receives signals in the MDB protocol over the second port P2 and converts the received signals into signals in the protocol used over the first port P1 and vice versa, using a set of conversion rules forming part of the program stored in the changer 110 and run on the microcontroller 400. The controller 130 is not able to communicate independently with the additional unit, so that the microcontroller converts any information generated from the additional money handling device so that it appears to the controller 130 to have been generated by the changer 110 and is in a format decodable by the controller 130.

In one example, a bill validator arranged to receive and validate Euro banknotes is connected via the second port P2 to the changer 110, which is arranged to receive and dispense British Sterling coins. The smallest bill recognised by the validator is a five Euro note. and the validator outputs the value of a recognised bill to the second port P2 in units of five Euros. For example, if a twenty Euro bill is validated, a value byte will be output with a value of 4. The changer 130 accepts 5, 10, 20, 50 pence and £1 coins, and outputs values over the first port P1 in units of 5 pence. The value of these units is set by a predetermined scaling factor SF, which scaling factor is stored within the controller 130.

For example, if a 50 pence coin is validated, this will be represented as 10 units. Hence, the units output by the changer 110 are not equal in value to the units output by the bill validator. The microcontroller 400 converts the units of the bill validator to those of the changer 110 by multiplying by a factor input by the operator. In this case, if the exchange rate for one Euro is 70 pence, the factor will be 1/70 (approximately 0.014), since 5 Euros/70=5 pence.

This factor is also used by the microcontroller 400 to convert commands including a value to the appropriate units. For example, to prevent acceptance of bills greater than 5 Euros, the microcontroller 400 sends a command over the second port P2 indicating the maximum value to be accepted, and indicates the value as '1'. This command may be issued in response to a command from the controller 130 to limit the amount of accumulated credit to £4 sterling. The microcontroller 400 infers from the value of the factor that the bill validator should not accept more than 5.71 Euros, which is rounded down to an integral number of units, in this case one unit.

The changer 110 may accumulate credit before communicating to the controller 130. For example, the controller 130 may indicate to the changer 110 the value at which the machine vends, and the changer 110 may then accumulate credit until the value is reached or exceeded, at which point the changer 110 dispenses any change due and indicates to the controller 130 that a vend should be made. If an additional money receiving unit, such as a bill validator or card reader, is connected to the second port P2, the changer 110 accumulates credit from that unit in addition to the value of the coins received by the changer 110. For example, if the additional unit is a bill validator arranged to receive and validate Euro banknotes, as in the example above, the validator may receive a five Euro bill and the changer 110 may receive a £1 coin, for a vend price of £4. The microcontroller 400 converts the one unit of value indicated on the second port P2 to 70 units of 5 pence, and adds the 20 units of 5 pence representing the £1 coin validated by the changer 110, to give 90 units. The vend price is 80 units, so the microcontroller 400 indicates on the first port P1 that a vend has been paid for, and determines how the 10 units of change should be dispensed. For example, if the microcontroller 400 detects that 50 pence coins are present in one of the coin tubes of the changer 110, one coin is dispensed from that tube. If change cannot be given to the exact value of overpayment, the microcontroller 400 controls the dispensing of coins as near as possible below the value of the overpayment.

As the second port P2 provides an MDB bus connection B, an additional change dispensing unit may be connected to the second port P2 in addition to a bill validator or card reader, and the microcontroller 400 interrogates the devices connected to the second port P2 to determine their type. For example, a Euro coin dispenser may be connected to the second port P2 and the microcontroller 400 may operate in a mode in which change is dispensed in Euros. The Euro coin dispenser communicates in units of 5 cents (100 cents=1 Euro). Therefore, instead of dispensing a 50 pence coin as in the example above, the microcontroller 400 signals to the Euro coin dispenser to dispense 14 units, which is the equivalent of 50 pence rounded down to the nearest whole number of units.

Figure 3:
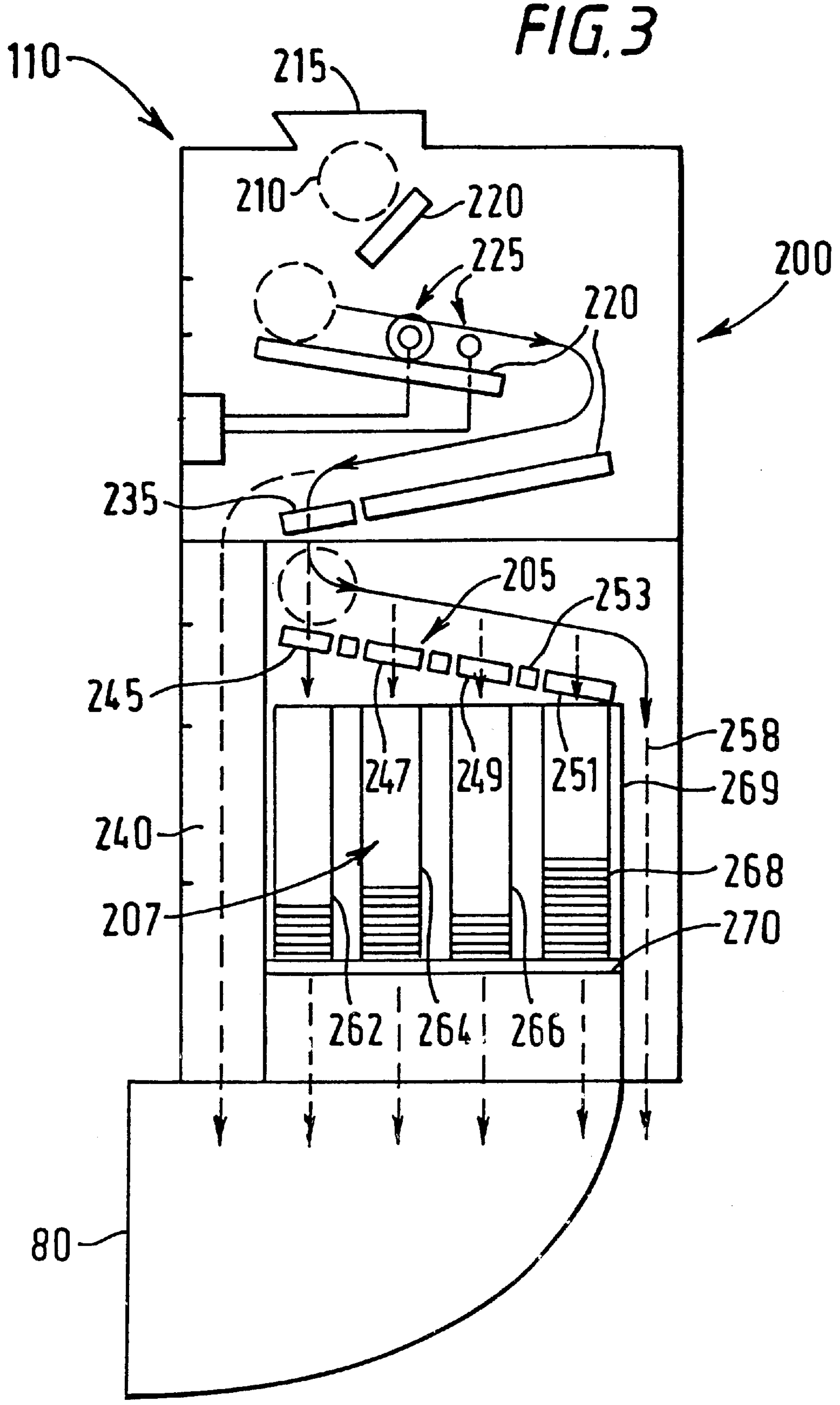
FIG. 3 is a cut-away front view of the changer showing the coin-handling apparatus.

Further details of the changer of the changer 110 are illustrated in FIG. 3. The changer comprises a coin validator 200, a coin separator 205 and a coin storage region 207. The coin validator 200 receives inserted coins 210 through an opening 215. The coin 210 travels along ramp 220 in the coin validator 200 past sensors such as those shown at 225. Suitable arrangements for sensors 225 include those described in GB 1 397 083, GB 1 443 934, GB 2 254 948 and GB 2 094 008 which are hereby incorporated by reference. The electrical signals generated by the sensors 225 contain information corresponding to the measured characteristics of the coin, such as a coin's diameter, thickness, metal content and electromagnetic properties. Based on these electrical signals, the microcontroller 400 is able to discriminate whether the coin is acceptable, and if so, the denomination of the coin 210.

If the coin 210 is unacceptable, the microcontroller 400 controls a gate 235 to direct the unacceptable coin 210 to a reject chute 240. In the alternative, acceptable coins 210 are directed to the coin separator 205 by the gate 235. The coin separator 205 may have a number of gates 245, 247, 249, 251 arranged along a ramp 253 and also controlled by signals from the microcontroller 400, for diverting the coin 210 from the ramp 253. The coin 210 may be diverted into respective containers 262, 264, 266 and 268, or the coin 210 may be allowed to proceed along ramp 253 to a path 258 leading to a cash box.

Each of the containers 262, 264, 266 and 268 is in the form of a coin tube arranged to store a vertical stack of coins of a particular denomination. Although only four containers are shown, any number may be provided.

The coin tubes are arranged within a removable cassette 269; such removable cassettes are well known in the art. As an example, a removable cassette is described in GB 2 246 897 A, the contents of which are incorporated herein by reference. The removable cassette is marked with a code, which indicates the denominations that are accommodated by the tubes within the cassette. The code is input using the keypad 90 on the changer 110 to inform the mechanism which cassette and tubes have been installed. Alternatively, the design may be such that the mechanism automatically recognises the type of cassette when it is inserted, or else the information could be provided remotely, or on a card.

The changer 110 may alternatively use passive routing techniques, such as those well known in the vending machine art, instead of the gates 245–251 for diverting the coin 210 from the ramp 253. Examples of suitable alternative configurations for the coin separator 205 are described in U.S. Pat. Nos. 3,844,297 and 4,106,610, which are hereby incorporated by reference.

A dispenser 270 associated with the coin tubes 262–268 is operable to dispense coins from the containers when change is to be given to a customer by the changer 110, under the control of the outputs O from the microcontroller 400. The dispensed coins are delivered to the coin return 80 for collection. Suitable dispensers 270 include those described in U.S. Pat. Nos. 3,814,115 and 4,367,760, which are hereby incorporated by reference. An alternative configuration may use, instead of the changer 110, a coin mechanism that does not pay out change. In such a configuration, a separate pre-loaded coin pay out device, such as those well known in the gaming machine art, may be used to pay out change.

A specific application of an embodiment of the invention is described below with reference to a vending machine, but this is not intended to be a limitation on the application of this invention.

Figure 4:
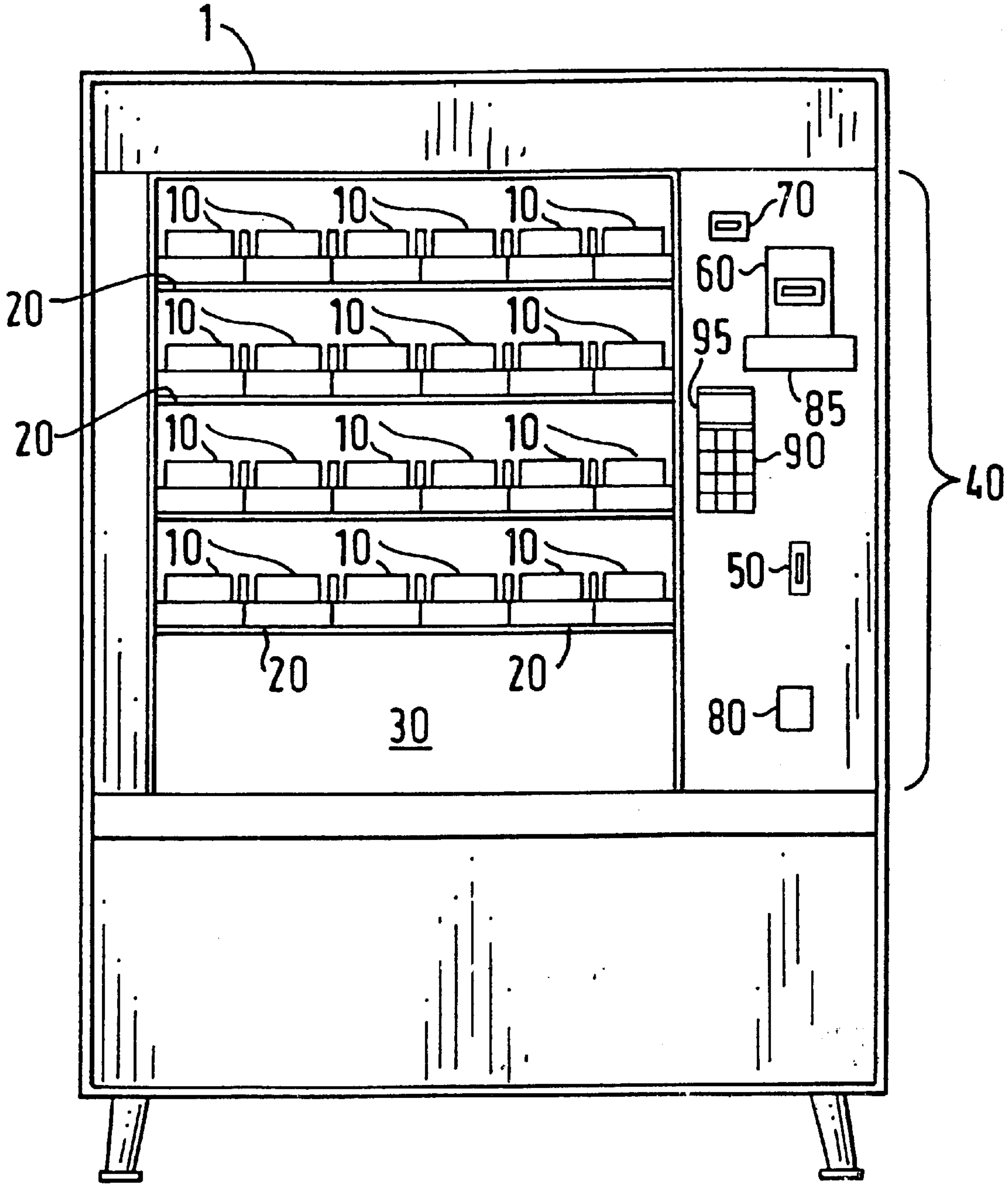
FIG. 4 is a front view of a vending machine incorporating the changer.

FIG. 4 illustrates a vending machine 1 which contains a variety of products 10 to be dispensed which are stored in an area inaccessible to customers, such as behind a glass panel. Each product 10 is retained by a product delivery apparatus 20 which is selectively actuable to dispense the product into a delivery area 30 that is accessible to the customer. Suitable product delivery apparatus 20 includes vend motors and solenoids as well as others well known in the art. Examples of such apparatus include those described in U.S. Pat. Nos. 4,458,187 and 4,785,927, which are hereby incorporated by reference.

A control panel 40 of the vending machine 1 contains a coin slot 50 and a banknote or bill insert slot 60 which accept currency to initiate a vend operation. The control panel 40 further contains the card acceptor 70 to enable customers to initiate a transaction with a credit or debit card. In addition, an electronic purse device in the form of a card may be inserted into the card acceptor 70 to initiate a transaction. The term "electronic purse device" is used herein to denote a token or card possessing an electronic circuit, a magnetic strip or other data storing medium or circuitry, for retaining a credit value. An electronic purse device may be in one of a variety of shapes, including a key or coin, as well as a card. Such devices may be used as currency in a variety of conventional automatic transaction systems.

A coin return 80, a bill pay out recess 85 and an item selector such as a keypad 90 are also provided in the control panel 40. A display 95 on the control panel 40 provides instructions and information to the customer. Suitable displays 95 include dot-matrix displays, selectively activatable message lights, an electronic scrolling message, or other displays capable of operating in the environmental conditions to which automatic transaction systems are typically exposed.

A customer may initiate a transaction by depositing coins or bills of particular denominations in the slots 50 or 60, respectively. The customer may also insert an electronic purse device, or a debit or credit card in the card acceptor 70 to initiate a transaction. Once sufficient payment has been deposited in the automatic transaction system 1, the customer may select a product 10 to be dispensed using the keypad 90. The corresponding product delivery apparatus 20 will then dispense the selected product 10 to the product delivery area 30 where it may be retrieved by the customer. Any resulting change from the transaction may be paid out through a coin return 80, the bill pay out recess 85 or credited to an inserted electronic purse device.

Figure 5:
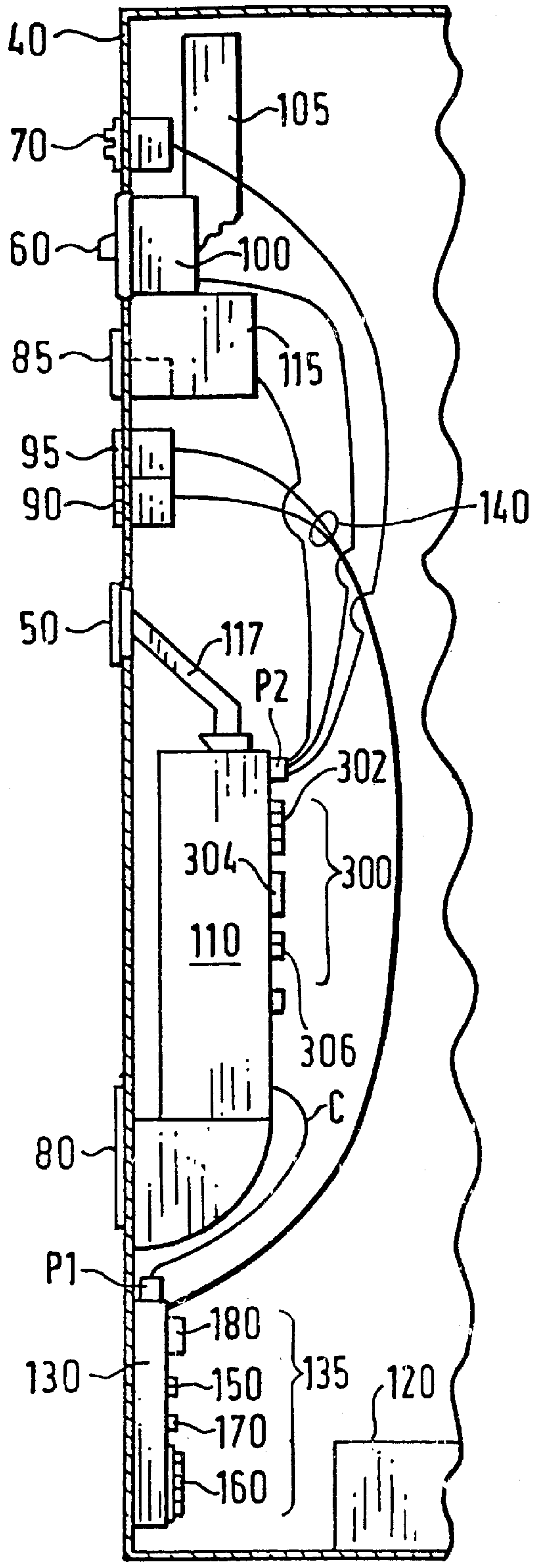
FIG. 5 is a partial cut-away side view of the front panel of the vending machine of FIG. 4.

FIG. 5 is a partial cutaway side view, not drawn to scale, of the vending machine 1 of FIG. 4 showing a typical component layout along the control panel 40. Money acceptors, such as a bill validator 100 and a changer 110, are attached to the rear of the control panel 40 adjacent the bill insert and coin slots 60 and 50, respectively. The changer 110 is connected to the coin return 80 and to a coin passageway 117 leading to the coin slot 50. The bill validator 100 is connected to a bill stacker 105. The changer 110 and bill validator 100 are capable of discriminating coins and bills respectively.

A bill escrow and pay out unit 115 is positioned adjacent the bill pay out recess 85 and is connected to the bill validator 100. The bill escrow and pay out unit 115 is capable of dispensing bills as change through the bill pay out recess 85. The bill validator 100 may divert deposited acceptable bills to the bill escrow and pay out unit 115 to replenish its supply of bills for change. Suitable bill escrow and pay out units 115 include those disclosed in U.S. Pat. No. 5,076,441, as well as others well-known in the art. The cash box 120 is also included in the vending machine 1.

The keypad 90 and display 95 are connected to the vend controller 130 by communication lines 140. The controller 130 is further connected to data input/output devices 135, such as DIP switches 150, a keypad 160, an input/output port 170 and a display 180 to facilitate entering and updating of operating data and servicing of the vending machine 1. The components disposed behind the control panel 40 are not accessible to customers of the vending machine 1 and may only be accessed by service personnel.

The first port P1 of the changer is connected to the vend controller 130 by the communication line C. The card acceptor 70, bill escrow and pay out unit 115, and bill validator 100 are not connected directly to the vend controller 130, but are connected to the second port P2 of the changer 110 via the bus connectors B. The changer 110 is arranged to receive various items of information received on the second port P2 from the bill validator 100, bill escrow and pay out unit 115 and card acceptor 70, and to pass this information, either as received or in modified form, to the controller 130. In particular, each time an acceptable unit of money is validated by either the bill validator 100 or the changer 110, a signal is sent to the vend controller 130 by the changer 110 indicating the value of the received unit.

The changer 110 is also provided with data input/output devices 300, including a keypad 302, display 304, and DIP switches 306.

Any bill validator that is capable of discriminating unique characteristics of bill denominations may be used as the bill validator 100 of FIG. 5. Suitable bill validators 100 include those described in U.S. Pat. Nos. 4,628,194 and 5,222,584, which are hereby incorporated by reference.

The invention has been described in the context of coin validators, but it is to be noted that the term "coin" is employed to mean any coin (whether valid or counterfeit), token, slug, washer, or other metallic object or item, and especially any metallic object or item which could be utilised by an individual in an attempt to operate a coin-operated device or system. A "valid coin" is considered to be an authentic coin, token, or the like, and especially an authentic coin of a monetary system or systems in which or with which a coin-operated device or system is intended to operate and of a denomination which such coin-operated device or system is intended selectively to receive and to treat as an item of value.

An embodiment has been described above with reference to a changer 110 having first and second ports P1 and P2. This type of device is advantageous because it provides in a single unit the commonly required functions of accepting payment and giving change in the form of coins. However, in other embodiments, other types of money handling unit may be provided with first and second ports P1 and P2 with analogous functions to those of the changer 110.

The described embodiment uses the MDB protocol over the second port P2, but other protocols may be used within the scope of the present invention. Likewise, other protocols in addition to or instead of the Executive, BDV, Electromechanical and MDB protocols may be implemented over the first port P1.

What is claimed is:

1. A device for handling money, including:

a money handling apparatus;

an internal controller for controlling the money handling apparatus;

a first port for removable connection to an external controller for communication with the internal controller; and a second port for removable connection to a further device for handling money;

wherein the internal controller is arranged to communicate over the second port with the further device using a communications protocol; and wherein the communications protocol enables communication between the internal controller and any one of at least first and second different types of device for handling money, the first type handling money of a different type from those handled by the second type.

2. A device as claimed in claim 1, wherein the first and second types of device are different members of a group consisting of a banknote validator and a card reader.

3. A device as claimed in claim 2, wherein the group further consists of a coin dispenser.

4. A device as claimed in claim 1, wherein the communications protocol is a bus-oriented protocol.

5. A device as claimed in claim 4, wherein the communications protocol is an MDB protocol.

6. A device as claimed in claim 1, wherein the internal controller is arranged to distinguish between said first and second type of device for handling money by a code received from said further device over said second port.

7. A method of communication for a money handling apparatus, including:

communicating with an external controller over a first port, and communicating with a further money handling apparatus over a second port by means of a communications protocol supporting communication with any one of at least first and second different types of device for handling money, the first type handling money of a different type from that handled by the second type.

8. A device for handling money, including:

a money handling apparatus;

an internal controller for controlling the money handling apparatus;

a first port for removable connection to an external controller for communication with the internal controller; and a second port for removable connection to a further device for handling money for communication with the internal controller;

wherein the internal controller is arranged to copy the content of signals between the first port and the second port.

9. A device as claimed in claim 8, wherein the content of all signals received on said first port is output without modification as signals on said second port and the content of all signals received on said second port is output without modification on said first port.

10. A device as claimed in claim 8, wherein the content of some of the signals received on the second port is modified prior to output on said first port.

11. A device as claimed in claim 10, wherein said signals, the content of which is modified, includes signals characteristic of the further device and not recognisable by said external controller.

12. A device as claimed in claim 8, wherein the internal controller implements, on both said first and second ports, a bus-oriented communications protocol.

13. A device as claimed in claim 8, wherein said signals are stored in memory prior to output.

14. A method of communication for a money handling apparatus, including:

communicating with an external controller over a first port; and communicating with a further money handling apparatus over a second port;

wherein the content of signals is copied between said first and second ports.

15. A device for handling money, including;

a money handling apparatus;

an internal controller for controlling the money handling apparatus;

a first port for removable connection to an external controller for communication with the internal controller; and a second port for removable connection to a further device for handling money for communication with the internal controller;

wherein the internal controller is arranged to convert between first units of value used for communications over said first port and second units of value used for communication over said second port.

16. A device as claimed in claim 15, wherein the internal controller is arranged to receive an indication of the value of money received by said further device in said second units, to convert said value to said first units, and to output data representing said value in said first units on said first port.

17. A device as claimed in claim 15, wherein the internal controller is arranged to receive a command including an indication of a value in said first units on said first port, to convert said value to said second units, and to output a corresponding command including an indication of said value in said second units on said second port.

18. A device as claimed in claim 15, wherein the internal controller is arranged to determine a first value of money received by said money handling apparatus, to receive an indication of a second value of money received by said further device in said second units, and to combine said first and second values as a combined value in a single set of units.

19. A method of communication for a money handling device, including:

communicating with an external controller via a first port, communicating with a further money handling device via a second port, and converting between first units of value used for communication over said first port and second units of value used for communication over said second port.

20. A device for handling money, including:

a money handling apparatus;

an internal controller for controlling the money handling apparatus;

a first port for removable connection to an external controller for communication with the internal controller; and a second port for removable connection to a further device for handling money for communication with the internal controller;

wherein the internal controller is arranged to receive a code indicative of the type of the further device on the second port, and to output in response thereto on the first port an amended code representative to said external controller of a type different from that of the further device.

21. A method of communication for a money handling device. including:

communicating with an external controller via a first port, communicating with a further money handling device via a second port, receiving a code indicative of the type of the further device on the second port, and outputting in response thereto on the first port an amended code representative to said external controller of a type different from that of the further device.

22. A device for handling money, including:

a money handling apparatus;

an internal controller for controlling the money handling apparatus; and a plurality of first ports each arranged for removable connection to an external controller for communication with the internal controller;

wherein the internal controller is arranged to detect to which of said first ports the external controller is connected and to communicate with the external controller using a communications protocol selected according to the detected one of the first ports.

23. A method of operating a money handling device having a plurality of ports each arranged for removable connection to an external controller, including:

detecting to which of said ports the external controller is connected and communicating with the external controller using a communications protocol selected according to the detected one of the ports.

* * * * *